Feb. 21, 1967  C. ENGLISH  3,304,810
SAW SHARPENING MACHINE
Filed Feb. 26, 1965  6 Sheets-Sheet 1

INVENTOR.
CECIL ENGLISH,
BY
Berman, Davidson & Berman
ATTORNEYS.

Feb. 21, 1967
C. ENGLISH
3,304,810
SAW SHARPENING MACHINE
Filed Feb. 26, 1965
6 Sheets-Sheet 2
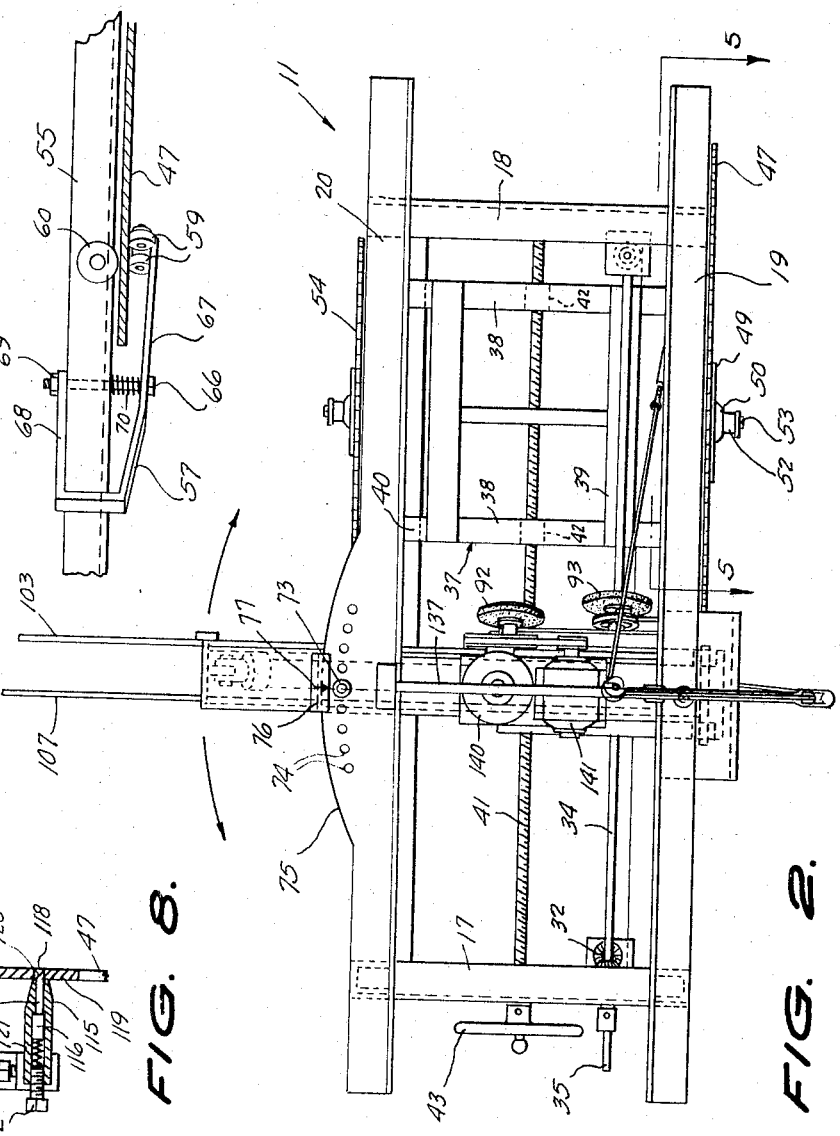
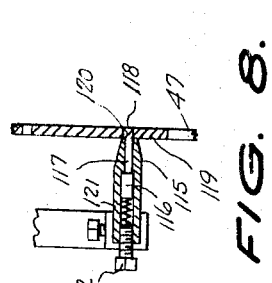
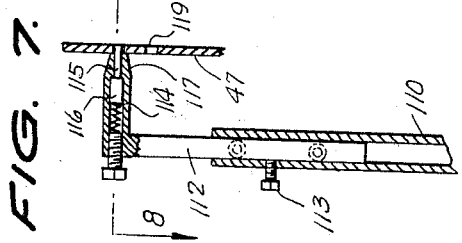
INVENTOR.
CECIL ENGLISH,
BY
Berman, Davidson & Berman
ATTORNEYS.

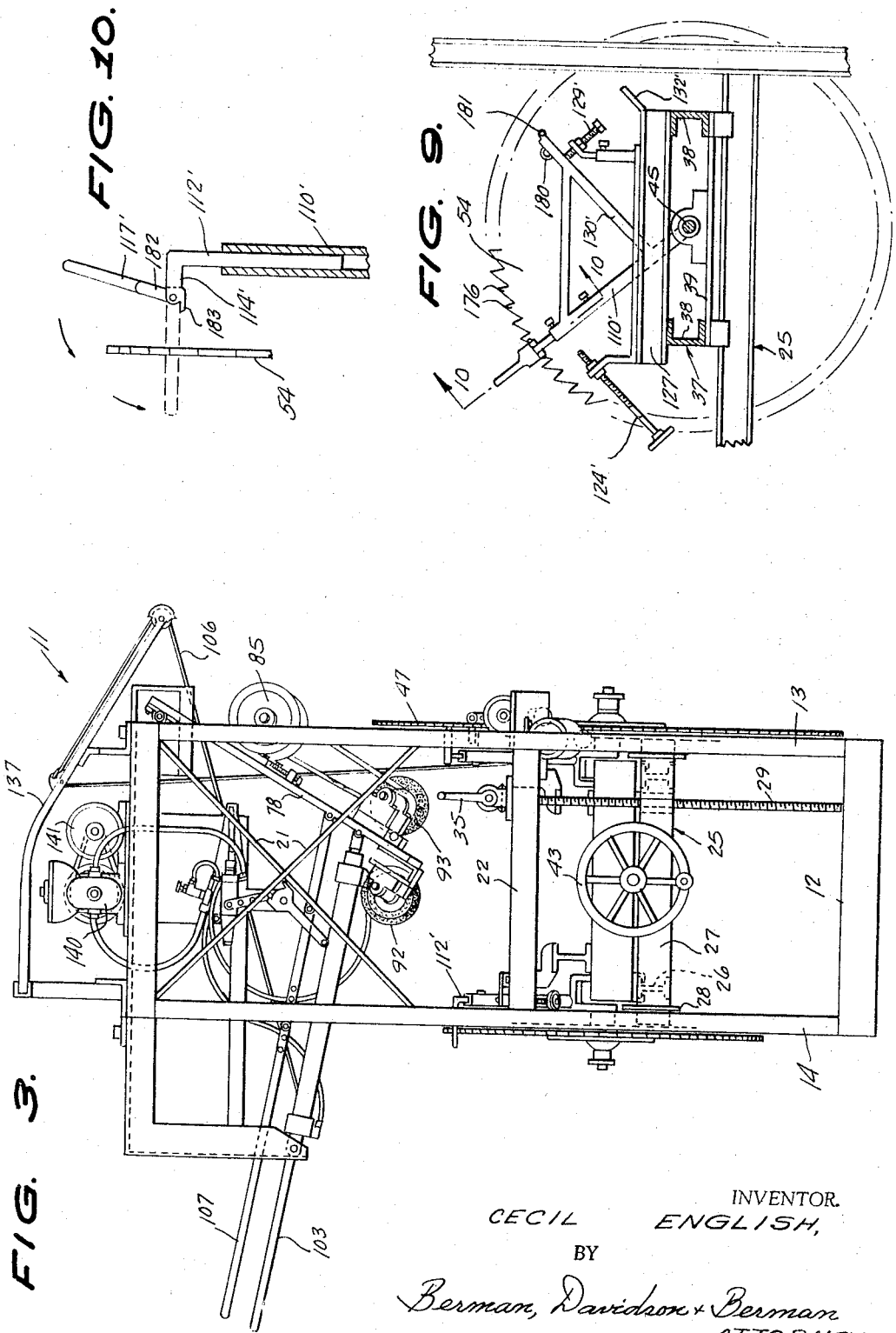

Feb. 21, 1967 C. ENGLISH 3,304,810
SAW SHARPENING MACHINE
Filed Feb. 26, 1965
6 Sheets-Sheet 4
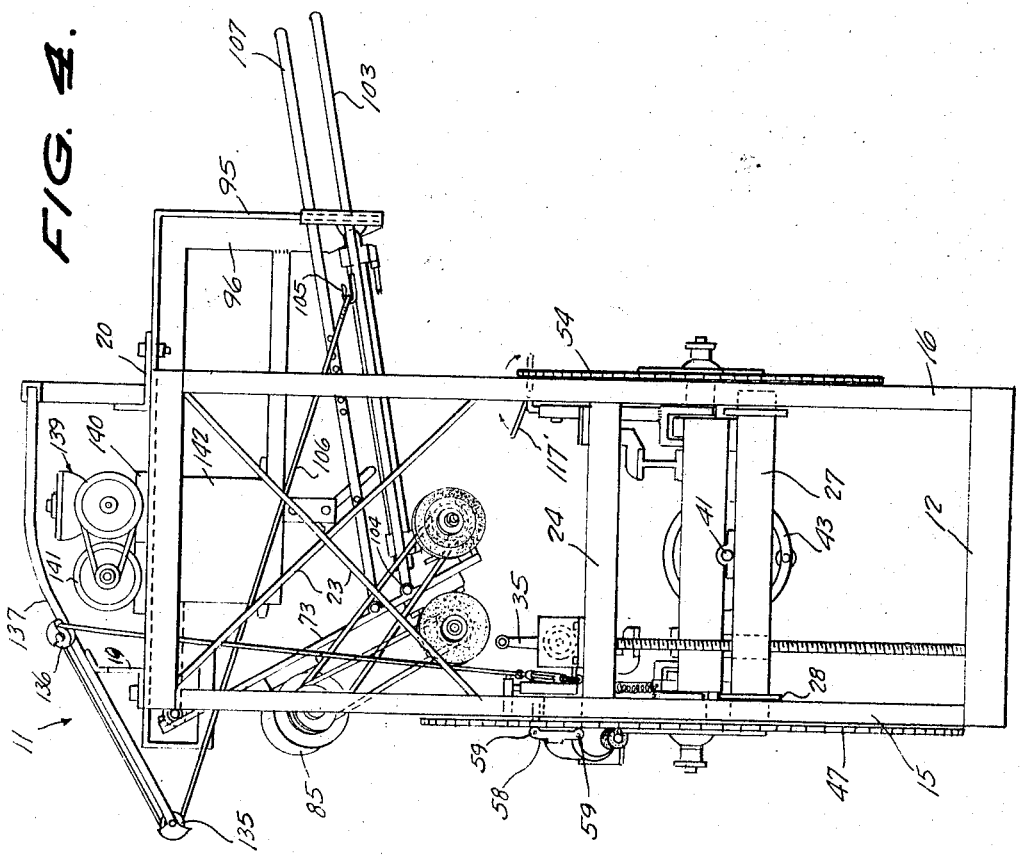
INVENTOR.
CECIL ENGLISH,
BY
Berman, Davidson + Berman
ATTORNEYS

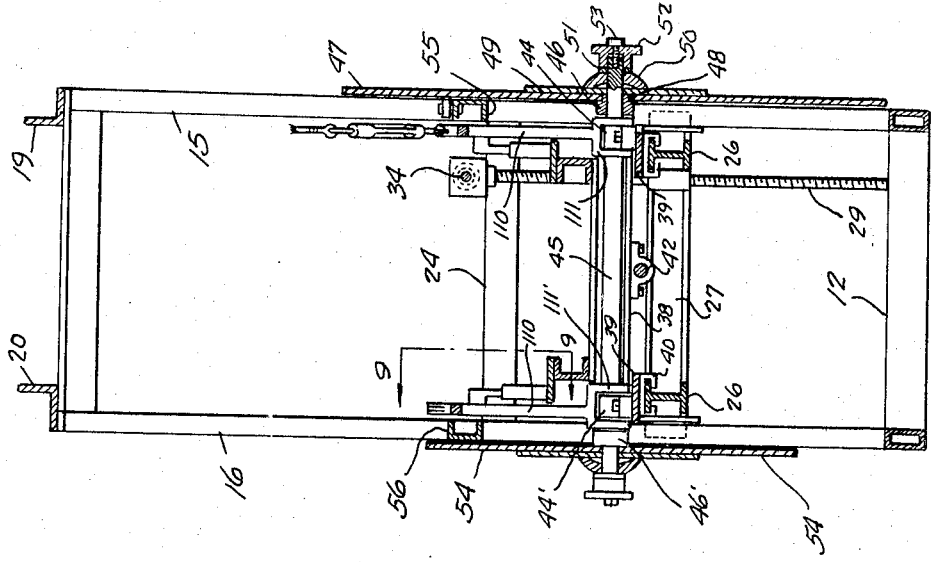
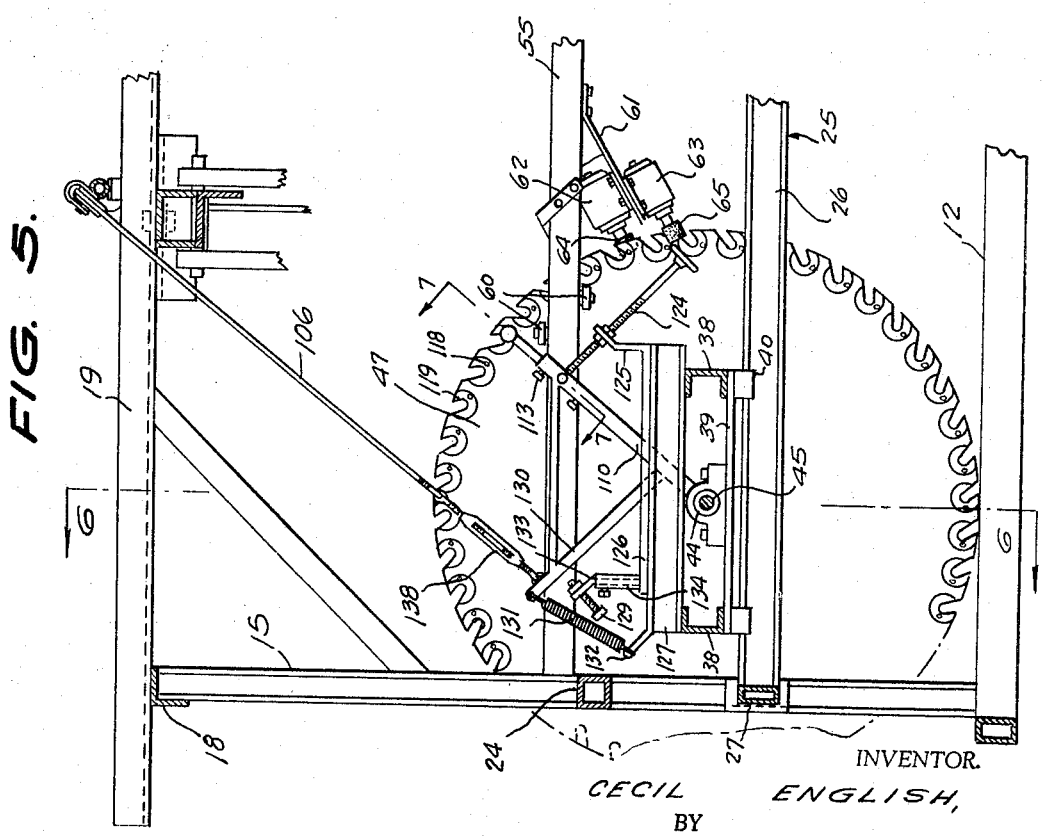

Feb. 21, 1967 C. ENGLISH 3,304,810
SAW SHARPENING MACHINE
Filed Feb. 26, 1965 6 Sheets-Sheet 6

INVENTOR.
CECIL ENGLISH,
BY
Berman, Davidson & Berman
ATTORNEYS.

United States Patent Office 3,304,810
Patented Feb. 21, 1967

3,304,810
SAW SHARPENING MACHINE
Cecil English, Rte. 355, Frederick Pike,
Rockville, Md. 20850
Filed Feb. 26, 1965, Ser. No. 435,609
10 Claims. (Cl. 76—40)

This invention relates to saw sharpening machine, and more particularly to a machine primarily intended for use in sharpening the teeth of large circular saws.

A main object of the invention is to provide a novel and improved saw sharpening machine which is relatively simple in construction, which is easy to operate, and which accurately grinds the top and inside cutting edges of saw teeth as well as the opposite sides thereof and includes automatic indexing means for advancing the saw blade being sharpened subsequent to the sharpening operation on each tooth thereof.

A further object of the invention is to provide an improved machine for sharpening the teeth of a wide range of sizes of circular saw blades, the machine involving relatively inexpensive components, being durable in construction, being substantially automatic in operation, and being easy to adjust.

A still further object of the invention is to provide an improved grinding machine for sharpening the teeth of a wide range of sizes of circular saws, the machine being provided with fluid-pressure-operated automatic feed means for advancing a saw blades being sharpened so as to provide accurate sequential sharpening of the teeth of the blade in a manner requiring minimum attention on the part of the operator.

A still further object of the invention is to provide an improved sharpening machine for grinding and sharpening the teeth of circular saws, the machine being provided with respective grinding wheels for dressing the various edges and surfaces of the saw teeth and being provided with means for automatically advancing the blade so that the respective teeth thereof will be sequentially sharpened in an identical manner, enabling relatively large saw blades as well as smaller blades to be efficiently and accurately sharpened in a relatively short period of time and with a minimum amount of labor.

A still further object of the invention is to provide a substantially completely automatic machine for sharpening the teeth of circular saw blades, the machine being adjustable to receive a wide range of different sizes of blades, being easy to set up for use, involving relatively few moving parts, providing highly accurate stepwise sharpening of the respective teeth of a saw blade, being provided with means so that the various edges of the saw blade teeth are ground to accurate angles, the settings of the machine being easily reproducible, and the machine providing ground edges on the saw blades which are highly uniform and accurately identical from tooth to tooth.

Still further objects and advantages of the invention will become apparent from the following description and claims, and from the accompanying drawings, wherein:

FIGURE 2 is a top plan view of the saw blade sharpening machine of FIGURE 1.

FIGURE 3 is a front end elevational view of the saw blade sharpening machine of FIGURES 1 and 2.

FIGURE 4 is a rear end elevational view of the saw blade sharpening machine of FIGURES 1 to 3.

FIGURE 5 is a fragmentary vertical cross sectional view taken substantially on the line 5—5 of FIGURE 2.

FIGURE 6 is a transverse vertical cross sectional view taken substantially on the line 6—6 of FIGURE 5.

FIGURE 7 is an enlarged fragmentary cross sectional view taken substantially on the line 7—7 of FIGURE 5.

FIGURE 8 is a cross sectional view taken substantially on the line 8—8 of FIGURE 7.

FIGURE 9 is a fragmentary vertical cross sectional view taken substantially on the line 9—9 of FIGURE 6.

FIGURE 10 is an enlarged cross sectional detail view taken substantially on the line 10—10 of FIGURE 9.

FIGURE 12 is an enlarged horizontal cross sectional detail view taken substantially on the line 12—12 of FIGURE 1.

FIGURE 13 is an enlarged fragmentary vertical cross sectional view taken substantially on the line 13—13 of FIGURE 1.

Figure 1:
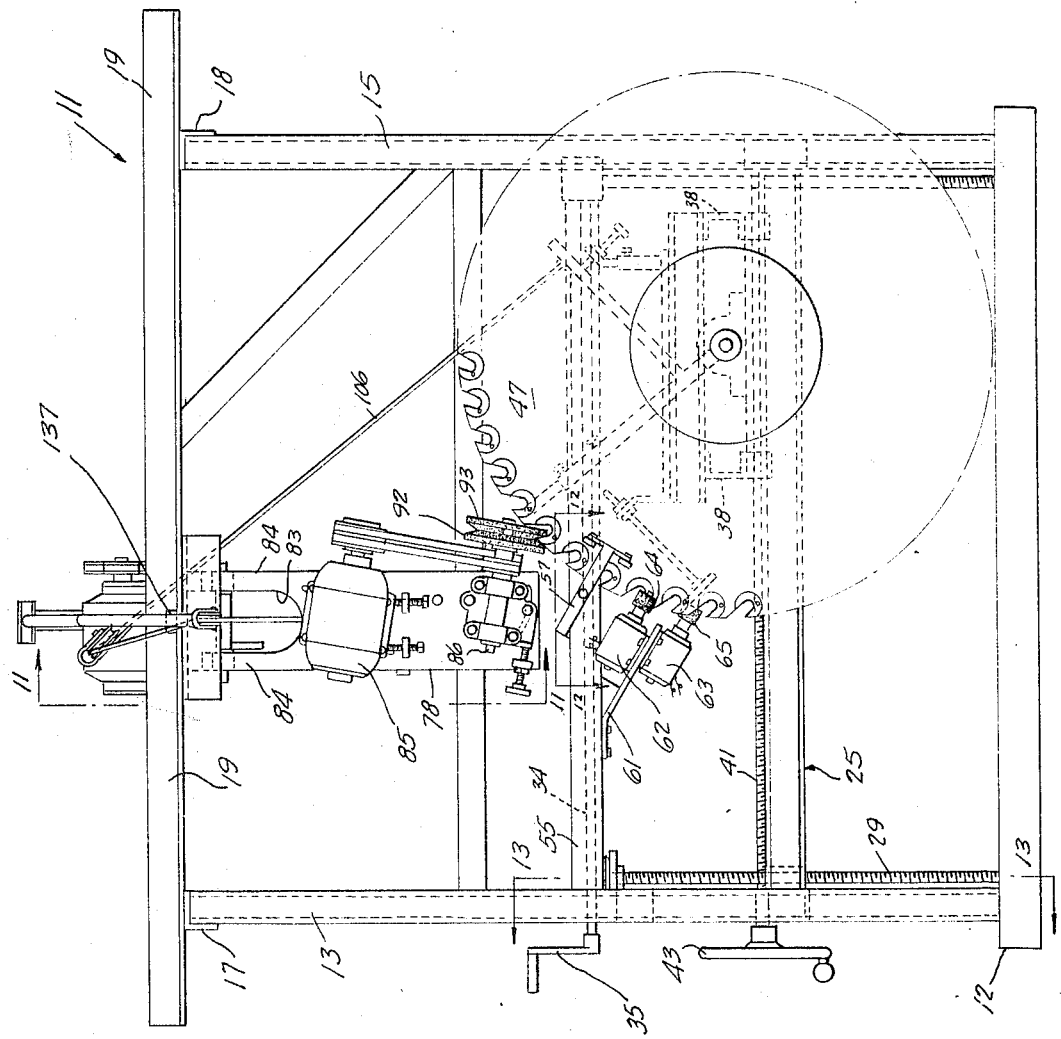
FIGURE 1 is a side elevational view of an improved saw blade sharpening machine constructed in accordance with the present invention.

Referring to the drawings, 11 generally designates an improved saw blade-sharpening machine constructed in accordance with the present invention. The machine 11 comprises a rectangular base frame 12 to the respective corner portions of which are rigidly secured the upstanding vertical post members 13, 14, 15 and 16. Rigidly secured on the top ends of the transversely aligned vertical posts 13 and 14 is a transversely extending horizontal angle bar 17 and similarly secured on the top end of the transversely aligned vertical post members 15 and 16 is a transversely extending horizontal angle bar 18. Rigidly secured to the ends of the respective transverse angle bars 17 and 18 are the respective longitudinally extending angle bars 19 and 20. The resultant structure defines a generally rectangular rigid framework which forms the supporting structure for the machine.

The front panel of the aforesaid framework, namely, that defined by the vertical post members 13, 14, is rigidly braced at its upper portion by means of diagonal tie rods 21, 21 and by a horizontal cross bar 22 rigidly connecting the intermediate portions of the vertical post members 13 and 14. Similarly, the rear panel of the framework, namely, that defined by the vertical post members 15 and 16, is rigidly braced by diagonal tie rods 23, 23 and by a cross bar 24 rigidly connecting the intermediate portions of the vertical post members 15 and 16.

Designated generally at 25 is a movable carriage assembly which is vertically slidable in the main frame, said movable carriage comprising a pair of longitudinally extending I-beams 26, 26 rigidly connected at their ends by transversely extending bars 27, 27 whose ends are slidably received in the channel-shaped vertical post members 13, 14, 15 and 16. Vertical guide plate members 28 are secured to the end portions of the bars 27 defining bearing collar elements located adjacent the edges of the flanges of the vertical post members, as shown in FIGURE 13, and cooperating with said flange edges to guide the carriage 25, smoothly as it is vertically adjusted. Respective vertical elevating screws 29, 29 are provided in the main frame of the machine adjacent its front and rear ends, said screws being journaled at their top and bottom ends in the manner illustrated in FIGURE 13, namely, being rotatably received at their lower ends in bearing collar elements 30 provided in the base member 12 and being rotatably received at their upper ends in bearings provided on brackets 31 secured on the cross bars 22 and 24, the top ends of the vertical screws being provided with bevel gears 32 which are meshingly engaged with bevel gears 33 mounted on a longitudinal horizontal shaft 34 suitably journaled in the main supporting frame of the machine and provided at its front end with an operating crank 35. The elevating screws 29 are threadedly engaged through respective cooperating nut members 36 rigidly secured on the cross bars 27 of carriage 25, whereby said carriage 25 is adjusted vertically responsive to rotation of the screws 29 resulting from rotation of longitudinal shaft 34 by means of the operating crank 35.

Designated generally at 37 is a frame member which is slidably supported on the carriage member 25 for longitudinal adjustment thereon. Thus, the frame member 37 comprises transverse channel bars 38, 38 rigidly connected by spaced longitudinal bars 39, 39, the transverse bars 38, 38 being provided at their ends with sleeve elements 40 which slidably embrace the top flanges of the longitudinal I-beams 26, 26, as shown in FIGURES 5 and 6. A longitudinal adjusting screw 41 is journaled on the cross bars 27, 27 of carriage 25 and is threadedly engaged through respective nut members 42, 42 secured on the intermediate portions of the transverse bar members 38 of the frame member 37. The longitudinal screw 41 is provided at its forward end with a hand wheel 43, the screw being rotatably secured on the respective cross bars 27, 27, as previously mentioned, so that rotation of the hand wheel 43 causes the frame member 37 to be adjusted longitudinally on the carriage 25.

Mounted on the intermediate portions of the bar members 39, 39 are respective transversely aligned bearings 44 and 44' in which is journaled a transverse shaft 45. Secured on the opposite end portions of shaft 45 are the respective collars 46 and 46', the collar 46 being located adjacent the longitudinal vertical plane defined by the vertical post members 13 and 15 and the collar 46' being located adjacent the vertical plane defined by the vertical post members 14 and 16. As shown in FIGURE 6, a circular saw blade 47 which is to be sharpened is clampingly secured on shaft 45 against collar 46. Thus, the blade 47 is provided with an annular filler washer 48 which is received in the central aperture of the blade and which itself has a central aperture closely receiving shaft 45. A centrally apertured bearing disc 49 receives the shaft 45 and bears against blade 47 and filler washer 48. A crowned, generally spherical annular washer 50 receives the shaft 45, bearing against the disc 49. An annular washer 51 is disposed on the shaft outwardly adjacent the crowned washer 50 and a centrally apertured cap 52 is engaged over the end of the shaft, receiving same and bearing against the washer 51. A clamping bolt 53 is engaged through the central aperture of cap 52 and threaded axially into the end of shaft 45, whereby the tightening of bolt 53 produces clamping thrust which is transmitted to the central portion of the blade 47, clamping the blade against collar 46 and thus locking the blade to shaft 45.

A blade template 54 may be fastened to the opposite end of shaft 45 in a similar manner, for a purpose presently to be described.

As will be readily apparent, the blade 47 may be easily mounted on shaft 45 by employing the respective elements shown in FIGURE 6, and by finally inserting the clamping screw 53 and tightening same. The blade 47 may be easily removed from the machine by a reverse procedure.

The intermediate portions of the vertical post members 13 and 15 are rigidly connected by a longitudinally extending channel bar 55, and the intermediate portions of the vertical post members 14 and 16 are similarly connected by a longitudinally extending channel bar 56. Secured on the intermediate portion of the channel bar 55 is an inclined bracket member 57 extending outwardly adjacent the blade 47 and provided with a transverse end arm 58 on which are journaled respective rollers 59, 59 engageable by the blade 47 to limit outward flexure of the blade. Additional supporting rollers 60, 60 are journaled on the top and bottom flanges of the frame bar 55 inwardly adjacent blade 47 to support the blade against inward flexure.

An inclined bracket 61 is secured to the bottom flange of the frame bar 55, and mounted on said bracket above and below same are respective motors 62 and 63 on whose shafts are mounted respective cylindrical grinding wheels 64 and 65 located to abrade the opposite sides of the teeth of the saw blade 47, so that the opposite sides of said teeth are properly dressed by the action of the rotating grinding wheels 64 and 65 during the blade-sharpening process, presently to be described.

As shown in FIGURE 12, the arm 57 is generally U-shaped and engages around bar 55, being pivotally connected to the bar by a transverse bolt 56. The U-shaped member 57 has a relatively long arm 67 and a short arm 68, the bolt 66 passing through the intermediate portion of the long arm 67 and through the end portion of the short arm 68 and being retained by a fastening nut 69. A coiled spring 70 is provided on the bolt 66 between the long arm 67 and the web portion of the longitudinal frame bar 55, whereby tightening of the nut 69 flexes the long arm 67 against the tension of the spring 70, placed under compression. This provides a means of adjusting the spring force of the long arm 67 and hence the pressure exerted by the rollers 59 on the saw blade 47.

Adjustably secured beneath the horizontal flanges of the longitudinal top frame bars 19 and 20 is a transversely extending plate member 71. Thus, a pivot bolt 72 connects one end portion of the plate member 71 to the horizontal flange of frame bar 19. Another bolt 73 is engageable through a selected one of an arcuately arranged series of apertures 74 on the flange of the frame bar 20, said series of apertures 74 being centered at the location of the pivot bolt 72. Thus, the plate member 71 may be angularly adjusted around the pivot bolt 72 by employing a selected aperture 74 to receive the fastening bolt 73.

As shown in FIGURE 2, the apertures 74 are located on an arcuate lip or projection 75 integrally formed on the horizontal flange of the frame bar 20, and the plate member 71 is provided with a flange 76 overlying the edge of the arcuate projection 75 and having an index pointer 77 inscribed thereon to facilitate the selection of the appropriate bolt hole 74.

Figure 11:
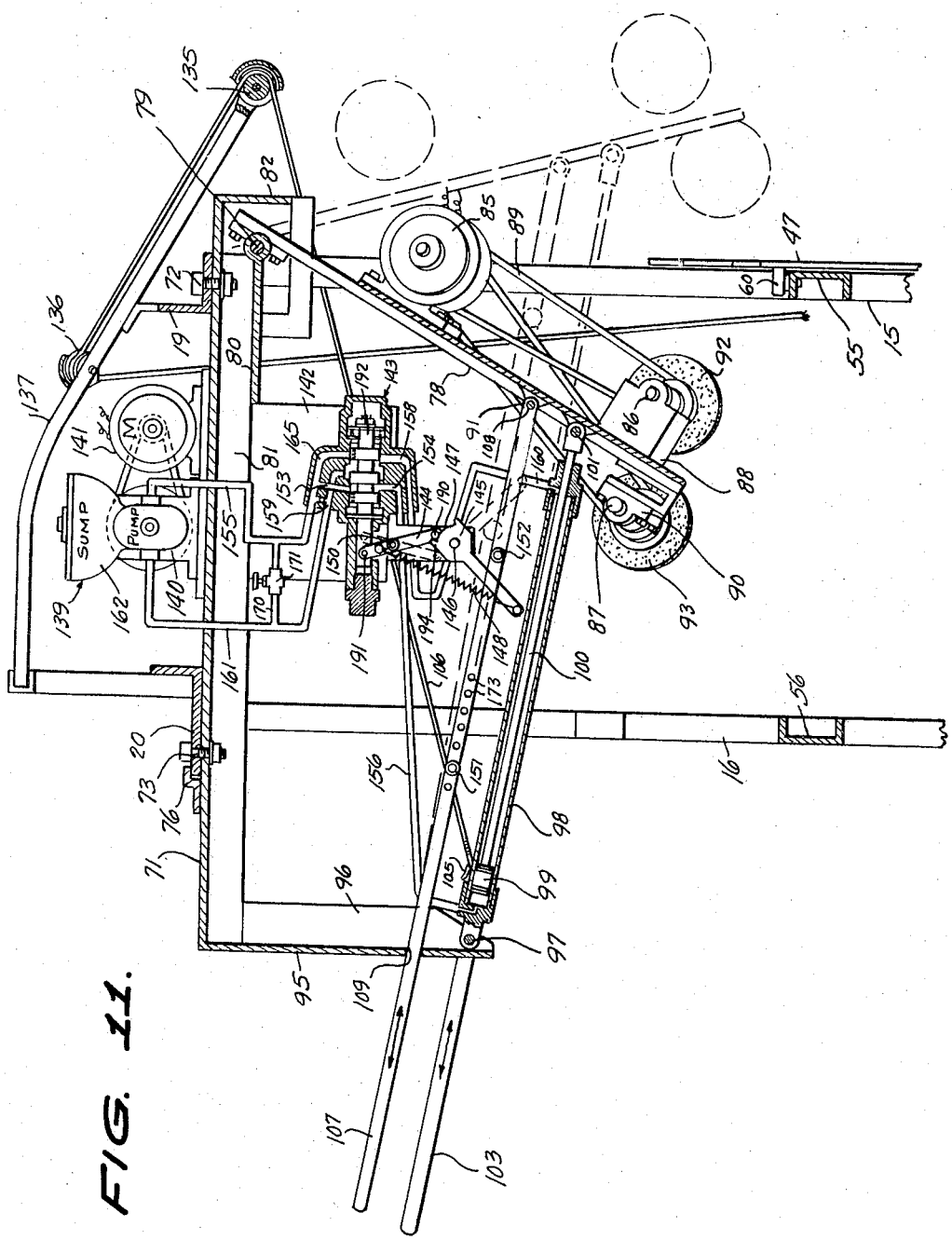
FIGURE 11 is an enlarged fragmentary vertical cross sectional view taken substantially on the line 11—11 of FIGURE 1.

Designated at 78 is a swinging plate member which is hinged at 79 to a bracket 80 secured to the bottom edges of the side flanges 81 of plate member 71 subjacent the longitudinal frame bar 19, the hinge connection 79 being on an axis parallel to the transverse end edge of plate member 71. The tranverse margin of plate member 71 extends over the hinged connection 79, said transverse margin being provided with a depending flange 82 spaced outwardly from and extending parallel to the axis of hinge 79, as shown in FIGURE 11. Plate member 78 is formed with a generally U-shaped notch 83 at its hinged end, defining the respective hinge arms 84, 84. Adjustably mounted on plate member 78 is the main grinding wheel drive motor 85 which is connected by respective pulley and belt systems to grinding wheel arbors 86 and 87 journaled on the free end portion of the hinged plate 78. Thus, the arbor shaft 86 is journaled in a supporting bearing assembly 88 mounted on the right side of plate 78, as viewed in FIGURE 11, and is drivingly connected to the motor 85 by a pulley system including a drive belt 89. Similarly, the arbor shaft 87 is mounted on a bearing assembly 90 which is secured on the left side of plate member 78, as viewed in FIGURE 11, and is driven by the motor 85 through a pulley system including a drive belt 91. Mounted on arbor shaft 86 is a first grinding wheel 92 and mounted on arbor shaft 87 is a second grinding wheel 93. As shown in FIGURE 1, the grinding wheels 92 and 93 are cooperatively located and shaped to respectively abrade the convergent outside and inside surfaces of a tooth of the saw blade 47, when positioned as shown in FIGURE 1, responsive to the swinging motion of plate 78 in a counterclockwise direction, as shown in FIGURE 11, from the full line position thereof to the dotted view position thereof. Thus, the wheels 92 and 93 may have generally frusto-conical abrading surfaces which face each other, as shown in FIGURE 1, and which are oriented, assuming proper adjustments of the position of the saw blade 47, to suitably dress the convergent toothed edges responsive to the counterclockwise path of plate member 78 above described. The same abrading action will of course occur upon the return swing of plate member 78 from the dotted view position thereof to the full line position thereof shown in FIGURE 11. As will be presently described, means are provided for automatically rotating the saw blade 47 through an angle corresponding to the angular spacing between successive teeth responsive to each complete swing of the hinged plate 78.

The end of the plate member 71 adjacent frame bar 20 is provided with a depending transverse wall member 95 having an end flange 96. Pivoted at 97 to the lower portion of end flange 96 is a hydraulic cylinder 98 provided with a piston 99 and a piston rod 100 which is pivotally connected at 101 to the lower portion of the hinged plate 78, as shown in FIGURE 11. A first rod member 103 extending parallel to the cylinder 98 and substantially at the same level thereof is pivotally connected to the hinged plate 78 at 104 (FIGURE 4) and extends slidably through an aperture provided therefor in the vertical wall element 95. A hook member 105 is secured to the intermediate portion of the rod member 103, and a flexible cable 106 has one end thereof connected to hook 105. A second rod member 107, extending parallel to and located above the cylinder 98 is pivotally connected at 108 to the plate member 78, extending slidably through an aperture 109 provided in the vertical wall 95. An arm 110 is rotatably engaged on shaft 45 adjacent the bracket 44, being provided with a yoke structure 111 engaging on opposite sides of the bearing bracket 44 to hold the arm 110 in place, namely, against movement in an axial direction relative to shaft 45. Arm 110 is of hollow square construction, as shown in FIGURE 7, and slidably receives a square rod 112 in its free end portion, said rod 112 being locked in adjusted position in any suitable manner, for example, by means of set screws 113. Rod 112 is formed with a laterally projecting hollow head portion 114 having a tapered end 115, said head portion containing a slidable plunger element 116 having a pin 117 extending through the bore of the tapered end portion 115 and being engageable in apertures 118 provided in the toothed inserts 119 of the saw blade 47. The outer ends of the pins 117 are beveled, as shown at 120, and the plunger element 116 is suitably held against rotation in the head 114, for example, by employing a non-circular bore in head 114 with the plunger element 116 of corresponding non-circular cross section. The plunger element 116 is biased toward the right, as viewed in FIGURE 7, by a coiled spring 121 disposed in the bore of the head 114 and held in tension by an adjustable stop screw 122 which is threadedly engaged in the end portion of head 114 opposite pin 117, as is clearly shown in FIGURES 7 and 8. With this arrangement, when arm 110 is rotated counterclockwise from the position thereof shown in FIGURE 5, the beveled end of pin 117 allows the pin to be pushed inwardly as it leaves the aperture 118, the end of the pin engaging in the next aperture 118 after sufficient counterclockwise rotation of arm 110. When arm 110 is rotated clockwise, as viewed in FIGURE 5, the pin 117 remains in the aperture 118 receiving same, whereby the saw blade 47 will be rotated clockwise with the arm 110.

Clockwise rotation of arm 110 is limited by the provision of an adjustable stop screw 124 mounted in a bracket 125 provided on a plate member 126 secured on frame bars 127 which are in turn secured transversely on the channel bars 38, 38. Another adjustable stop screw 129 is provided at the opposite end of the plate member 126, in a position to be engaged by a bar element 130 rigidly secured perpendicular to the arm 110. The engagement of bar 130 with stop screw 129 limits the counterclockwise rotation of arm 110, as viewed in FIGURE 5, to an angle sufficient for pin 117 to travel from one aperture 118 to the next successive aperture. Bar 130 is biased in a counterclockwise direction, as viewed in FIGURE 5, by a coiled spring 131 having one end thereof connected to the end of bar 130 and the other end thereof connected to a lug 132 on the end of one of the bars 127.

The stop screw 129 is mounted on an adjustable arm 133 which is adjustably secured in a vertical upstanding sleeve 134 carried on plate 126.

The flexible cable 106 extends over supporting pulleys 135 and 136 rotatably mounted on a top frame structure 137 provided on the top of the machine, one end of the cable being connected to the hook 105, as previously mentioned, and the other end of the cable being connected through an adjusting turn buckle 138 to the outer end portion of the bar member 130. When the cable 106 is placed under tension, for example, by the movement of the piston 99 to the left end position thereof in cylinder 98, as shown in FIGURE 11, the tension is transmitted to the bar 130, causing arm 110 to be rotated into engagement with the end of stop screw 124, thereby advancing the saw blade 147 clockwise through one angular step corresponding to the angular spacing between adjacent teeth. When the tension in the cable 106 is released, as when the piston 99 moves toward the right end of cylinder 98, as viewed in FIGURE 11, spring 131 moves bar 130 into engagement with stop screw 129, causing the pin 117 to slip out of the first-engaged tooth aperture 118 and to move into the next tooth aperture.

The force exerted on the saw blade 47 by the rollers 59, 59, in cooperation with the opposing rollers 60, is sufficient to hold the saw blade 47 stationary while the bevel pin 117 disengages from one aperture 118 and moves toward the next aperture responsive to the counterclockwise rotation of arm 110, as above described. However, the tension developed in the cable 106 is sufficient to overcome the frictional holding force of the rollers 59 and 60.

It will therefore be apparent that when fluid is admitted to the left end of cylinder 98, the piston 99 is moved to the right from the position thereof shown in FIGURE 11, swinging the plate member 78 in a counterclockwise direction from the full line position thereof to the dotted line position thereof, during which the grinding wheels 92 and 93, driven by motor 85, make a pass across the plane of the saw blade 47, the wheel 92 abrading the outer edge of the tooth of a toothed insert 119 of the blade and the grinding wheel 93 abrading the inside edge of the tooth. The blade is meanwhile held stationary by the force exerted thereon by the opposing rollers 59 and 60. As the tension of the cable 106 is reduced, the spring 131 acts on the bar member 130 and the arm 110 to rotate the arm counterclockwise from the position thereof shown in FIGURE 5, moving the pin 117 into the aperture 118 of the next tooth insert of the saw blade. When the direction of movement of the piston 99 is reversed, namely, when the fluid is admitted into the right end of the cylinder 98, in a manner presently to be described, the piston moves toward the left end of the cylinder, as viewed in FIGURE 11, swinging the plate member 78 from the dotted view position thereof toward the full line view position thereof, thereby causing the grinding wheels 92 and 93 to make another pass through the toothed insert of the blade. After the grinding wheels have passed the toothed insert and approach the full line position thereof shown in FIGURE 11, sufficient tension develops in the cable 106 to overcome the force of spring 131, causing the arm 110 to be swung clockwise into engagement with the end of the stop screw 124, namely, to the position shown in FIGURE 5, which rotates the saw blade 47 through the required angular step to bring the next toothed insert into position for sharpening.

Mounted on the top plate 71 is a hydraulic pump assembly 139 comprising a compressor 140 driven by an electric motor 141. Secured on a flange 142 depending from plate 71 is a conventional reversing valve assembly 143 operated by a toggle linkage including a lever 144 pivotally connected to the valve piston and pivoted to the main body of the valve, the lever being operatively engageable by an escapement arm 145 pivoted at 146 to a depending arm 147 carried by the main valve body. A coiled spring 148 connects the end of the arm 145 to a point on lever 144 above its pivot connection to the valve body, shown at 150, the spring 148 acting through the escapement arm 145 and the toggle lever 144 to bias the valve piston toward either of its opposite extreme positions in the valve casing, the spring 48 acting to rapidly move the valve piston toward one of said positions as soon as the arm 145 has been moved slightly past a dead center position thereof. Thus, the assembly 143 is of the snap-acting type, providing rapid reversal of the valve. The arm 145 extends adjacent to and crosses the rod 107 and is engageable by respective rollers 151 and 152 provided on the rod 107 responsive to the back and forth movement of the rod caused by the swinging movement of the plate member 78. When the plate member 78 swings toward the full line position thereof shown in FIGURE 11, namely, in a clockwise direction, the roller 152 engages the toggle lever 145 and rotates said toggle lever clockwise toward the position thereof shown in FIGURE 11, which causes the valve piston to be moved leftward toward the position thereof shown in FIGURE 11. In this position the valve piston is properly located to connect a passage 153 in the valve body to another passage 154 in said body. Passage 153 is connected to the outlet conduit 155 of the pump 140 and passage 154 is connected by a conduit 156 to the left end of the hydraulic cylinder 98. In this position the valve piston also connects a passage 158 in the valve body to a passage 159 therein, the passage 158 being connected by a conduit 160 to the right end of cylinder 98 and the passage 159 being connected to the return conduit 161 of the pump 140. Therefore, hydraulic fluid in the right end portion of the cylinder 98 is forced back through the return conduit 161 to the reservoir 162 of the pump.

With the valve assembly 143 in the position shown in FIGURE 11, hydraulic fluid will be admitted into the left end of the cylinder 98 to cause the piston 99 to move rightward therein. As above mentioned, this swings the plate member 78 in a counterclockwise direction. When the roller 151 engages the lever 145, the lever is rotated counterclockwise, as viewed in FIGURE 11, until it passes the dead center position, whereupon the valve assembly 143 is reversed. The valve piston then moves rapidly to the right from the position thereof shown in FIGURE 11, connecting a passage 165 in the valve body to the passage 158. The passage 165 is connected, together with the passage 153, to the pump outlet conduit 155. Therefore, this conveys hydraulic fluid under pressure to the right end of the cylinder 98. Simultaneously the passage 154 is connected by the valve piston to the return conduit 161, allowing the hydraulic fluid in the left portion of cylinder 98 to return to the pump reservoir. Piston 99 is thus driven to the left, returning the plate member 78 from the dotted view position thereof toward the full line position thereof shown in FIGURE 11. When the roller 152 engages the toggle lever 145 and rotates the toggle lever clockwise past its dead center position, the valve assembly 143 again reverses and assumes the position thereof shown in full line view in FIGURE 11, thereby causing the initiation of the next cycle of operation similar to that above described.

The speed of operation of the reversing valve assembly 143, and hence of the swinging movement of plate member 78, is controlled by the provision of a bypass conduit 170 which connects the outlet conduit 155 of pump 140 to the return conduit 161 thereof, the bypass conduit 170 being provided with a manually adjustable speed control valve 171 employed to adjust the amount of hydraulic fluid under pressure bypassed between conduit 155 and conduit 161.

The valve-operating rod 107 is provided with a plurality of spaced openings 173, the toggle lever-operating roller 151 being adapted to be mounted in a selected one of said openings, whereby to adjust the stroke of the piston 99 in cylinder 98.

Thus, both the speed of operation of the machine (by means of valve 171) and the amplitude of excursion of the plate member 78 (by means of apertures 173) may be readily adjusted.

As previously mentioned, the position of the saw blade 47 to be sharpened may be accurately adjusted in its own plane by suitable actuation of hand wheel 43 and crank member 35. This provides means whereby large saw blades over a substantial range of sizes may be sharpened in the machine. In using the machine in the manner above described, the type of blades contemplated are those which include tooth inserts 119 having indexing apertures 118. In the case of smaller blades not provided with such apertured teeth or tooth inserts, the machine may be used by employing a suitable template member 54 having ratchet teeth 176 spaced in the same manner as the saw teeth. The template member 54 is fastened on the shaft 45 adjacent the bearing 44' in the same manner as described in connection with the saw blade 47, the template member 54 being clamped against the retaining collar 46'. A yoke 111' similar to the yoke 111 straddles the bearing block 44' and is rotatably connected to the shaft 45, the yoke assembly 111' being provided with the arm 110', similar to the arm 110 previously described. Projecting at right angles from the arm 110' is a bar member 130' (see FIGURE 9) engageable with a stop screw 129' mounted in the same manner as the stop screw 129, previously described, to limit clockwise rotation of arm 110', as viewed in FIGURE 9. A square rod 112' is adjustably secured in a square bore provided in the end of arm 110' and has a horizontally projecting top portion 114' to which is pivoted a ratchet dog member 117' which may be swung to the dotted view horizontal position thereof shown in FIGURE 10, wherein it is engageable with the ratchet teeth 176 on the template member 54. The bar member 130' is provided with an attachment loop 180 by means of which it may be connected to the turn buckle member 138, whereby it is operable by the cable 106 in the manner previously described in connection with arm 110. The bar member 130' is also provided with a loop 181 to which one end of the spring 131 may be connected, the other end of the spring being connected to a lug 132' projecting from one of the members 127, whereby to bias arm 110' in a clockwise direction, as viewed in FIGURE 9, against stop screw 129'. Counterclockwise rotation of arm 110' is limited by the provision of an adjustable stop screw 124', mounted in a manner similar to that employed for mounting the stop screw 124, previously described.

With the dog 117' rotated to its horizontal dotted view position of FIGURE 10, the oscillation of the frame structure comprising arm 110' and bar member 130', produced by cable 106 responsive to the swinging movement of plate member 78 causes template member 54 to advance one step for each full swinging cycle of plate member 78, thereby causing the blade being sharpened to be similarly advanced. Thus, the dog 117' operates in a manner similar to that of the beveled pin 117, previously described, to automatically index the saw blade being sharpened responsive to the successive cycles of oscillation of the swinging plate member 78.

When the template member 54 is not being used, the dog 117' is rotated to its full line position, shown in FIGURE 10, namely its upright position, wherein it is supported by the engagement of a shoulder portion 182 thereof against the top surface of the projection 114'. A supporting lip 183 is provided to support the dog 117' in its horizontal dotted view position.

Thus, the modified arrangement illustrated in FIGURES 9 and 10 operates essentially in the same manner as the form of the machine described previously for sharpening blades having apertured tooth inserts. The swinging movement of the plate member 78 is controlled and regulated by the operation of the reversing valve assembly 143 and its associated toggle linkage including the escapement member 145 which drivingly cooperates with the pin element 190 on the lower end of the toggle lever 144. As previously mentioned the top end of the toggle lever 144 is pivotally connected at 191 to the reciprocating valve piston 192. Sufficient dwell of the valve piston 192 is provided to insure the required amplitude of swing of the plate member 78 by the provision of adequate spacing between the escapement lugs 194 of the escapement arm 145.

While a specific embodiment of an improved machine for sharpening circular saw blades has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A circular saw blade sharpening machine comprising a supporting frame, means to rotatably support a circular saw blade on said frame, a swinging member hingedly connected to said frame, blade-abrading means on said swinging member, said swinging member being swingable to move said blade-abrading means against a tooth surface of a circular saw blade mounted on said supporting means, means to oscillate said swinging member, means to rotate said supporting means through an angle corresponding to the angular spacing between successive teeth on the circular saw blade responsive to each cycle of oscillation of said swinging member, respective side abrading wheels mounted on said frame adjacent to and on opposite sides of the plane of the circular saw blade, and drive means connected to said side abrading wheels.

2. A circular saw blade sharpening machine comprising an upstanding supporting frame, a blade-supporting shaft journaled on said frame, means to clampingly secure a circular saw blade to an end portion of said shaft in a substantially vertical position at one side of the frame, a swinging member hinged to said frame for oscillation on an axis above and substantially transverse to said shaft, a grinding wheel rotatably mounted on said swinging member in a position to engage a tooth surface of the saw blade, said swinging member being swingable to move the grinding wheel to and fro past said tooth surface, means driving said grinding wheel, fluid-pressure operated jack means connected between the frame and the swinging member and including an extensible piston rod element, means to alternately admit fluid into the opposite ends of said jack means, whereby to alternately extend and retract said piston rod element and oscillate said swinging member, the extension of said piston rod element being sufficient to oscillate said swinging member through the plane of the saw blade, and means to rotate said shaft through an angle equal to the angular spacing between successive teeth on the saw blade responsive to each cycle of oscillation of said swinging member.

3. A circular saw blade sharpening machine comprising an upstanding supporting frame, a blade-supporting shaft journaled on said frame, means to clampingly secure a circular saw blade to an end portion of said shaft in a substantially vertical position at one side of the frame, a swinging member hinged to said frame for oscillation on an axis above and substantially transverse to said shaft, a grinding wheel rotatably mounted on said swinging member in a position to engage a tooth surface of the saw blade, said swinging member being swingable to move the grinding wheel to and fro past said tooth surface, means driving said grinding wheel, fluid-pressure operated jack means connected between the frame and the swinging member and including an extensible piston rod, means to alternately admit fluid into the opposite ends of said jack means, whereby to alternately extend and retract said piston rod and oscillate said swinging member, the extension of said piston rod being sufficient to oscillate said swinging member through the plane of the saw blade, oscillating pawl means rotatably mounted on the frame and including an element drivingly engageable with a saw blade secured on the shaft, and means to move said element through an angle equal to the angular spacing between successive teeth of the saw blade responsive to each cycle of oscillation of said swinging member.

4. A circular saw blade sharpening machine comprising an upstanding supporting frame, a blade-supporting shaft journaled on said frame, means to clampingly secure a circular saw blade to an end portion of said shaft in a substantially vertical position at one side of the frame, a swingable member hinged to said frame for oscillation on an axis above and substantially transverse to said shaft, a grinding wheel rotatably mounted on said swinging member in a position to engage a tooth surface of the saw blade, said swinging member being swingable to move the grinding wheel to and fro past said tooth surface, means driving said grinding wheel, a fluid pressure cylinder pivoted to said frame and having a piston provided with an extensible piston rod, means pivotally connecting said piston rod to said swinging member, a source of pressure fluid, a reversing valve, conduit means connecting said source to opposite ends of said cylinder through said reversing valve, means to reverse said valve responsive to oscillation of said swinging member, whereby to alternately admit fluid into the opposite ends of the cylinder and to alternately extend and retract said piston rod and oscillate said swinging member, the extension of said piston rod being sufficient to oscillate said swinging member through the plane of the saw blade, and means to rotate said shaft through an angle equal to the angular spacing between successive teeth on the saw blade responsive to each cycle of oscillation of said swinging member.

5. A circular saw blade sharpening machine comprising an upstanding supporting frame, a blade-supporting shaft journaled on said frame, means to clampingly secure a circular saw blade to an end portion of said shaft in a substantially vertical position at one side of the frame, a swinging member hinged to said frame for oscillation on an axis above and substantially transverse to said shaft, a grinding wheel rotatably mounted on said swinging member in a position to engage a tooth surface of the saw blade, said swinging member being swingable to move the grinding wheel to and fro past said tooth surface, means driving said grinding wheel, fluid pressure-operated jack means connected between the frame and the swinging member and including an extensible piston rod, a source of pressure fluid, a reversing valve, conduit means connecting said source to opposite ends of said jack means through said reversing valve, means to reverse said valve responsive to oscillation of said swinging member, whereby to alternately admit fluid into the opposite ends of the jack means and to alternately extend and retract said piston rod and oscillate said swinging member, the extension of said piston rod being sufficient to oscillate said swinging member through the plane of the saw blade, and means to rotate said shaft through an angle equal to the angular spacing between successive teeth on the saw blade responsive to each cycle of oscillation of said swinging member.

6. A circular saw blade sharpening machine comprising an upstanding supporting frame, a blade-supporting shaft journaled on said frame, means to clampingly secure a circular saw blade to an end portion of said shaft in a substantially vertical position at one side of the frame, a swinging member hinged to said frame for oscillation on an axis above and substantially transverse to said shaft, a grinding wheel rotatably mounted on said swinging member in a position to engage a tooth surface of the saw blade, said swinging member being swingable to move the grinding wheel to and fro past said tooth surface, means driving said grinding wheel, a fluid pressure cylinder pivoted to said frame and having a piston provided with an extensible piston rod, means pivotally connecting said piston rod to said swinging member, a source of pressure fluid, a reversing valve, conduit means connecting said source to opposite ends of said cylinder through said reversing valve, said valve having a movable reversing member and a pivoted actuating lever operatively connected to said reversing member, a pivoted escapement arm on the valve operatively engageable with said actuating lever, toggle means biasing said escapement arm toward opposite positions of rotation relative to a dead center position, said actuating lever being movable to reverse the position of said movable member responsive to movement of said escapement arm past said dead center position, means to oscillate said escapement arm responsive to oscillation of said swinging member, whereby to alternately admit fluid into the opposite ends of the cylinder and to alternately extend and retract said piston rod and oscillate said swinging member, the extension of said piston rod being sufficient to oscillate said swinging member through the plane of the saw blade, and means to rotate said shaft through an angle equal to the angular spacing between successive teeth on the saw blade responsive to each cycle of oscillation of said swinging member.

7. A circular saw blade sharpening machine comprising an upstanding supporting frame, a blade-supporting shaft journaled on said frame, means to clampingly secure a circular saw blade to an end portion of said shaft in a substantially vertical position at one side of the frame, a swinging member hinged to said frame for oscillation on an axis above and substantially transverse to said shaft, a grinding wheel rotatably mounted on said swinging member in a position to engage a tooth surface of the saw blade, said swinging member being swingable to move the grinding wheel to and fro past said tooth surface, means driving said grinding wheel, fluid pressure-operated jack means connected between the frame and the swinging member and including an extensible piston rod, a source of pressure fluid, a reversing valve, conduit means connecting said source to opposite ends of said jack means through said reversing valve, said valve having a movable reversing member and a pivoted actuating lever operatively connected to said reversing member, a pivoted escapement arm on the valve operatively engageable with said actuating lever, toggle means biasing said escapement arm toward opposite positions of rotation relative to a dead center position, said actuating lever being movable to reverse the position of said movable member responsive to movement of said escapement arm past said dead center position, means to oscillate said escapement arm responsive to oscillation of said swinging member, whereby to alternately admit fluid into the opposite ends of the cylinder and to alternately extend and retract said piston rod and oscillate said swinging member, the extension of said piston rod being sufficient to oscillate said swinging member through the plane of the saw blade, and means to rotate said shaft through an angle equal to the angular spacing between successive teeth on the saw blade responsive to each cycle of oscillation of said swinging member.

8. A circular saw blade sharpening machine comprising an upstanding supporting frame, a blade-supporting shaft journaled on said frame, means to clampingly secure a circular saw blade to an end portion of said shaft in a substantially vertical position at one side of the frame, a swinging member hinged to said frame for oscillation on an axis above and substantially transverse to said shaft, a grinding wheel rotatably mounted on said swinging member in a position to engage a tooth surface of the saw blade, said swinging member being swingable to move the grinding wheel to and fro past said tooth surface, means driving said grinding wheel, fluid pressure-operated jack means connected between the frame and the swinging member and including as extensible piston rod, a source of pressure fluid, a reversing valve, conduit means connecting said source to opposite ends of said jack means through said reversing valve, said valve having a movable reversing member and a pivoted actuating lever operatively connected to said reversing member, a pivoted escapement arm on the valve operatively engageable with said actuating lever, toggle means biasing said escapement arm toward opposite positions of rotation relative to a dead center position, said actuating lever being movable to reverse the position of said movable member responsive to movement of said escapement arm past dead center position, means to oscillate said escapement arm responsive to oscillation of said swinging member, whereby to alternately admit fluid into the opposite ends of the jack means and to alternately extend and retract said piston rod and oscillate said swinging member, the extension of said piston rod being sufficient to oscillate said swinging member through the plane of the saw blade, oscillating pawl means rotatably mounted on the frame and including an element drivingly engageable with a saw blade secured on the shaft, and means to move said element through an angle equal to the angular spacing between successive teeth on the saw blade responsive to each cycle of oscillation of said swinging member.

9. A circular saw blade sharpening machine comprising an upstanding supporting frame, a blade-supporting shaft journaled on said frame, means to clampingly secure a circular saw blade to an end portion of said shaft in a substantially vertical position at one side of the frame, a swinging member hinged to said frame for oscillation on an axis above and substantially transverse to said shaft, a grinding wheel rotatably mounted on said swinging member in a position to engage a tooth surface of the saw blade, said swinging member being swingable to move the grinding wheel to and fro past said tooth surface, means driving said grinding wheel, fluid pressure-operated jack means connected between the frame and the swinging member and including an extensible piston rod, a source of pressure fluid, a reversing valve, conduit means connecting said source to opposite ends of said jack means through said reversing valve, said valve having a movable reversing member and a pivoted actuating lever operatively connected to said reversing member, a pivoted escapement arm on the valve operatively engageable with said actuating lever, toggle means biasing said escapement arm toward opposite positions of rotation relative to a dead center position, said actuating lever being movable to reverse the position of said movable member responsive to movement of said escapement arm past said dead center position, means to oscillate said escapement arm responsive to oscillation of said swinging member, whereby to alternately admit fluid into the opposite ends of the jack means and to alternately extend and retract said piston rod and oscillate said swinging member, the extension of said piston rod being sufficient to oscillate said swinging member through the plane of the saw blade, oscillating pawl means rotatably mounted on the frame and including an element drivingly engageable with a saw blade secured on the shaft, means to move said element through an angle equal to the angular spacing between successive teeth on the saw blade responsive to each cycle of oscillation of said swinging member, respective side abrading wheels mounted on said frame adjacent to and at opposite sides of the plane of the circular saw blade, and drive means connected to said side abrading wheels.

10. A circular saw blade sharpening machine comprising an upstanding supporting frame, a blade-supporting shaft journaled on said frame, means to clampingly secure a circular saw blade to an end portion of said shaft in a substantially vertical position at one side of the frame, a swinging member hinged to said frame for oscillation on an axis above and substantially transverse to said shaft, a grinding wheel rotatably mounted on said swinging member in a position to engage a tooth surface of the saw blade, said swinging member being swingable to move the grinding wheel to and fro past said tooth surface, means driving said grinding wheel, a fluid pressure cylinder pivoted to said frame and having a piston provided with an extensible piston rod, means pivotally connecting said piston rod to said swinging member, a source of pressure fluid, a reversing valve, conduit means connecting said source to opposite ends of said cylinder through said reversing valve, said valve having a movable reversing member and a pivoted actuating lever operatively connected to said reversing member, a pivoted escapement arm on the valve operatively engageable with said actuating lever, toggle means biasing said escapement arm toward opposite positions of rotation relative to a dead center position, said actuating lever being movable to reverse the position of said movable member responsive to movement of said escapement arm past said dead center position, means to oscillate said escapement arm responsive to oscillation of said swinging member, whereby to alternately admit fluid into the opposite ends of the cylinder and to alternately extend and retract said piston rod and oscillate said swinging member, the extension of said piston rod being sufficient to oscillate said swinging member through the plane of the saw blade, oscillating pawl means rotatably mounted on the frame and including an element drivingly engageable with a saw blade secured on the shaft, means to move said element through an angle equal to the angular spacing between successive teeth on the saw blade responsive to each cycle of oscillation of said swinging member, respective side abrading wheels mounted on said frame adjacent to and at opposite sides of the plane of the circular saw blade, and drive means connected to said side abrading wheels.

References Cited by the Examiner

UNITED STATES PATENTS

| | | | |
|---|---|---|---|
| 2,517,873 | 8/1950 | Harrell | 76—40 |
| 2,521,777 | 9/1950 | Collis | 76—40 |
| 3,066,552 | 12/1962 | Gavin | 76—40 |

GRANVILLE Y. CUSTER, JR., *Primary Examiner.*